Sept. 18, 1956  H. H. RUGG  2,763,711
ELECTRICAL BUS STRUCTURES
Filed March 8, 1952  2 Sheets-Sheet 1
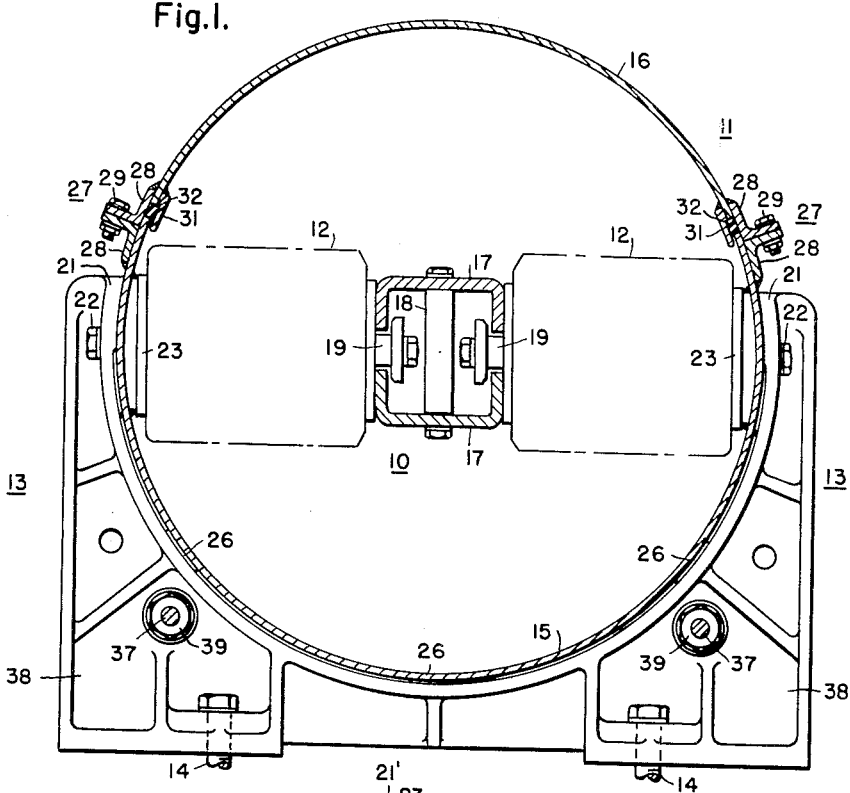
Fig.1.
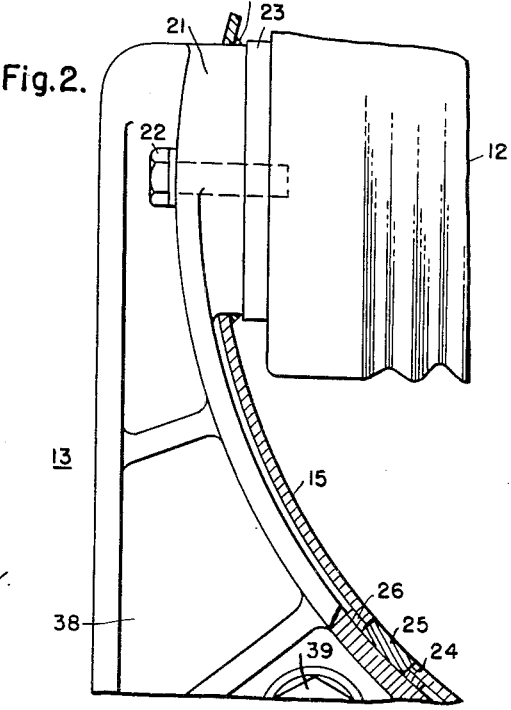
Fig.2.
WITNESSES:
INVENTOR
Harold H. Rugg.
BY 
ATTORNEY Sept. 18, 1956 H. H. RUGG 2,763,711
ELECTRICAL BUS STRUCTURES
Filed March 8, 1952 2 Sheets-Sheet 2
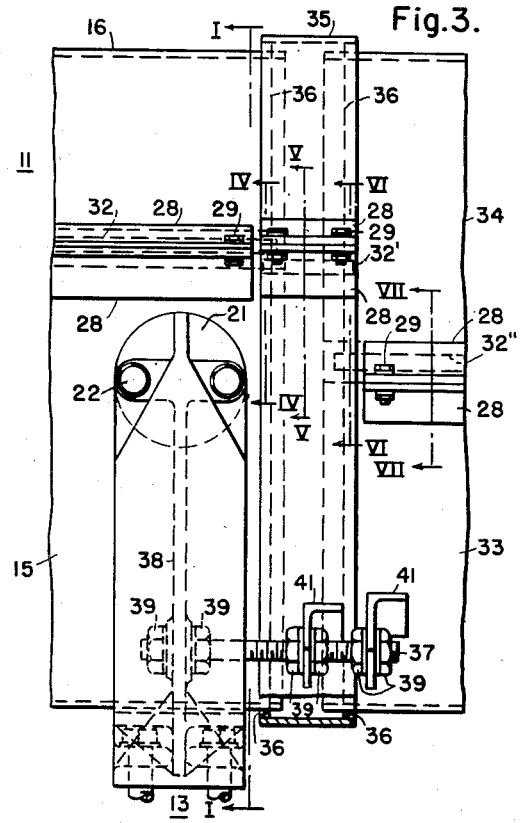
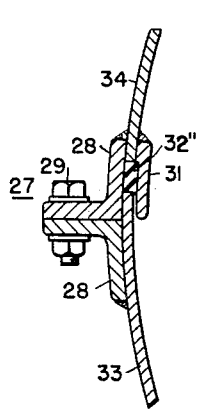
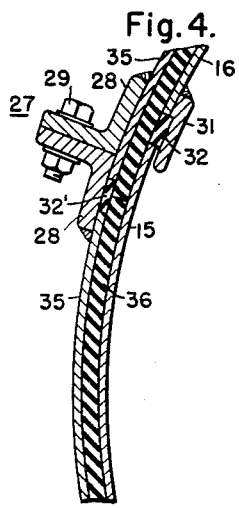
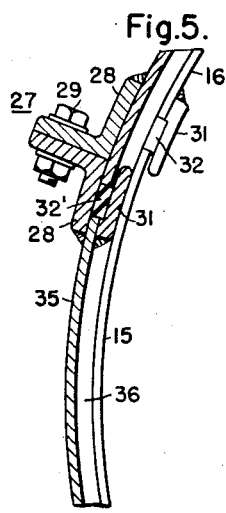
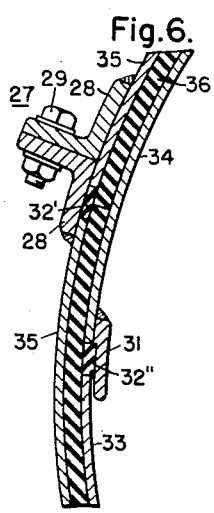
WITNESSES:
INVENTOR
Harold H. Rugg.
BY
ATTORNEY United States Patent Office 2,763,711
Patented Sept. 18, 1956

2,763,711

ELECTRICAL BUS STRUCTURES

Harold H. Rugg, Pittsburgh, Pa., assignor to Westinghouse Electric Corporation, East Pittsburgh, Pa., a corporation of Pennsylvania Application March 8, 1952, Serial No. 275,612

15 Claims. (Cl. 174—99)

My invention relates generally to electrical bus structures and, more particularly, to metal-enclosed isolated-phase bus structures of the type disclosed in U. S. Patent No. 2,531,017, issued Nov. 21, 1950, to C. P. West, H. H. Rugg and P. R. Pierson, and assigned to the same assignee as this application.

As described in the aforesaid patent, an electrical conductor is mounted in a metal trough which is slightly more than semi-circular in cross section and may be built in sections of predetermined lengths. The trough is supported by supporting members welded to the trough and having feet for attachment to a supporting structure. The conductor is supported by pairs of oppositely disposed insulators mounted in the trough at predetermined intervals. A removable cover is provided for each section of trough to complete the enclosure.

An object of my invention is to simplify and improve the manner of mounting the trough in the supporting members.

Another object of my invention is to provide for rigidly mounting the conductor-supporting insulators in the trough.

A further object of my invention is to provide for tightly sealing the enclosing housing or sheath for the bus conductor.

Other objects of my invention will be explained fully hereinafter or will be apparent to those skilled in the art.

In accordance with one embodiment of my invention, the trough portion of the housing for the bus conductor is mounted in spaced castings. Each casting is made with a semi-cylindrical bore and has integrally formed diametrically opposed bosses which project through openings in the trough. The insulators are seated directly on the bosses and are rigidly attached by bolts extending through the bosses. The trough is spaced away from the bore of the casting slightly which makes it unnecessary to machine the bore. The openings in the troughs around the bosses are welded tightly all the way around the openings, and ring gaskets around the ends of the enclosure overlap longitudinal gaskets between the trough and the cover portions of the enclosure, thereby tightly sealing the enclosure.

For a better understanding of the nature and objects of the invention, reference may be had to the following detailed description, taken in conjunction with the accompanying drawings, in which:

Figure 1 is a view, partly in elevation and partly in section, of a bus structure embodying the principal features of the invention, the section being taken along the line I—I in Fig. 3;

Fig. 2 is an enlarged view of a portion of the structure shown in Fig. 1;

Fig. 3 is a view, in side elevation, of a portion of the bus structure, and

Figs. 4, 5, 6 and 7 are views, in section, taken along the lines IV—IV, V—V, VI—VI and VII—VII, respectively, in Fig. 3.

Referring to the drawings, and particularly to Fig. 1, the structure shown therein comprises a bus conductor 10, a housing 11 for enclosing the conductor 10, a pair of insulators 12 mounted in the housing for supporting the conductor 10, and a supporting member 13 which supports the housing 11 and the insulators 12. The supporting member 13 may be attached to a suitable supporting structure (not shown) by means of bolts 14.

As described in the aforesaid Patent 2,531,017, the housing 11 comprises a trough 15 which is slightly greater than a semi-circle in cross section and a cover 16 which completes the enclosure for the bus conductor 10.

As is fully described in the co-pending application of C. P. West and H. H. Rugg, Serial No. 275,611, filed March 8, 1952, the bus conductor 10 comprises a pair of channel members 17 which are maintained in spaced relation by spacing members 18 and are slidably mounted between the insulators 12 on bus retainers 19. Since the manner of mounting the conductor 10 is fully described in the aforesaid co-pending application, it will not be described in more detail in this application.

Each supporting member 13 is preferably cast from aluminum or other non-magnetic material. As shown, the member 13 has a semi-circular bore with diametrically opposed bosses 21 formed integrally with the member 13. As shown most clearly in Fig. 2, each boss 21 projects through an opening in the trough 15 and the trough is secured to the boss by welding at 21' all the way around the opening to make a dust-tight joint. The insulator 12 is rigidly attached to a plane surface on the boss 21 by means of stud bolts 22 which are threaded into a metal insert 23 in the insulator 12.

As also shown in Fig. 2, the trough 15 is spaced a slight distance from the bore of the supporting member 13. The trough may be secured to the bore of the member 13 by plug welding the trough to the bore at predetermined points as shown in Fig. 2. The plug weld may be made by providing a hole 24 in the trough and filling the hole with welding material 25. If desired, a washer 26 may be placed around the hole 24 between the trough 15 and the bore of the supporting member 13 to prevent the welding material from flowing away from the hole 24.

Since the trough 15 is spaced from the bore of the supporting member 13, it is not necessary to machine the entire surface of the bore, as slight irregularities in the surface will not interfere with the mounting of the trough in the bore. Thus, the only surfaces which require machining are the parallel surfaces of the two opposite bosses 21 to which the insulators 12 are attached. In this manner a great amount of time and expense is saved in the construction of the bus structure.

It is desirable that the housing 11 be sealed reasonably tight in order to prevent dirt and moisture from entering the housing. As previously stated, the openings in the trough 15 for the bosses 21 are sealed by welding around the openings. As shown in Fig. 1, the cover 16 may be attached to the trough 15 by clamps 27. Each clamp 27 comprises a pair of angle members 28, one of which is welded to the trough 15 and the other of which is welded to the cover 16. The angle members are drawn together by bolts 29.

A retainer strip 31 may be welded to the cover 16 and spaced from the angle members 28. A straight gasket 32, which may be composed of cork or other suitable gasket material, is disposed between the edges of the trough 15 and the cover 16 and between the retainer strip 31 and the angle member 28. Thus, when the angle members 28 are drawn together by the bolts 29 the gasket 32 is compressed between the edges of the trough and the cover to seal the joint between the trough and the cover.

As shown in Fig. 3, an additional trough section 33 which is semi-circular in cross section may be disposed coaxially with the trough 15 and mounted between supporting members 13 but not secured directly to the supporting members 13. A semi-circular cover 34 is provided for the trough 33. As shown in Fig. 7, the cover 34 may be attached to the trough 33 by clamping means 27 in the same manner as the cover 16 is attached to the trough 15.

As also shown in Fig. 3, the trough 33 and its cover 34, which are of substantially the same diameter as the housing 11, may be attached to the housing 11 by a split clamping ring 35 which overlaps the adjacent ends of the housing 11 and the additional trough section. As shown in Fig. 5, the ends of the clamping ring 35 may be drawn together by clamping means 27 which are similar to the ones previously described. A gasket 32' is disposed between the edges of the clamping ring and is retained by a gasket retainer 31 in the manner previously described.

As shown in Fig. 4, a circular gasket 36 is disposed between the clamping ring 35 and the trough 15 and its cover 16. As shown in Figs. 3 and 4, the circular gasket 36 overlaps the straight gasket 32 provided between the housing 15 and its cover 16 and is disposed underneath the end of the straight gasket 32' between the ends of the clamping ring 35. Thus the joints between the clamping ring 35 and the housing 11 are tightly sealed since the clamping force is applied directly to the surfaces of the gaskets which are in contact. The gaskets are under direct compression and a tight seal is obtained. This is not true of prior constructions in which the seal between a circular gasket and a straight gasket depends upon longitudinal expansion of the straight gasket when compressed to provide the seal between the end of the straight gasket which butts against the circular gasket and is not overlapped by the circular gasket.

As shown in Fig. 6 the seal between the clamping ring 35 and the trough 33 and its cover 34 is similar to the seal between the ring 35 and the trough 15 and its cover 16. A circular gasket 36 overlaps the straight gasket 32" disposed between the edges of the members 33 and 34. The gasket 36 is disposed underneath the straight gasket 32' disposed between the ends of the clamping ring 35, thus the contact surfaces between these gaskets is under direct compression when the clamping ring is drawn tightly against the housing sections. In this manner all joints between the members of the housing sections are tightly sealed.

As shown in Fig. 3 a grounding bolt 37 is attached to a web 38 on the supporting member 13 by means of nuts 39. The clamping ring 35 is attached to the bolt 37 by a bracket 41 and nuts 39. Likewise, the trough 33 is attached to the bolt 37 by a bracket 41 and nuts 39. In this manner the clamping ring 35 and the trough 33 may be grounded through the supporting member 13 which, as previously explained, is attached to a supporting structure. As previously described, the trough 15 is welded to the supporting member 13 and the cover members 16 and 34 are connected to the trough members 15 and 33, respectively, by the clamping means 27. Thus, all parts of the housing structure may be grounded through the supporting members 13.

The grounding bolt 37 also functions to prevent longitudinal movement of the clamping structure 35 and the trough since these members are attached to the supporting member 13 by the bolt 37. As previously explained, supporting members 13 may be provided at predetermined intervals along the housing section 11. The housing sections may be manufactured in predetermined lengths. Where necessary, depending upon installation conditions, the space between housing sections may be enclosed by housing members such as the trough section 33 and its cover 34. As described, these members may be supported by clamping rings 35. Furthermore, the clamping rings 35 are particularly useful in attaching L and T connections to the housing sections 11. The L or T connections may be readily removed by first removing the clamping rings 35.

From the foregoing description, it is apparent that I have provided a bus housing structure which is of a strong and rigid construction and which may be readily manufactured and installed. Furthermore, the housing may be tightly sealed to exclude dirt and moisture from the housing. The housing structure is so constructed that it may be readily assembled when being installed or disassembled when desired.

Since numerous changes may be made in the above described construction, and different embodiments of the invention may be made without departing from the spirit and scope therein, it is intended that all matter contained in the foregoing description or shown in the accompanying drawing shall be interpreted as illustrative and not in a limiting sense.

I claim as my invention:

1. In a bus structure, in combination, a bus conductor, a substantially cylindrical housing for enclosing the conductor, a supporting member having a substantially semi-cylindrical bore for the housing with bosses projecting through openings in the housing, and insulating means attached to said bosses for supporting the conductor.

2. In a bus structure, in combination, a bus conductor, a curved housing for enclosing the conductor, a supporting member having a substantially semi-cylindrical bore for the housing with diametrically opposed bosses projecting through openings in the housings, said housing being welded to said bosses around said openings, and insulators attached to said bosses for supporting the conductor.

3. In a bus structure, in combination, a bus conductor, a curved trough for the conductor, a supporting member having a curved bore for the trough with integrally formed diametrically opposed bosses projecting through openings in the trough, insulators attached to said bosses for supporting the conductor, and a cover removably attached to the trough.

4. In a bus structure, in combination, a bus conductor, a curved trough for the conductor, a supporting member having a curved bore for the trough with integrally formed diametrically opposed bosses projecting through openings in the trough, said trough being spaced from a major part of the curved surface of the supporting member and secured to said member around said bosses, insulators attached to said bosses for supporting the conductor, and a cover for the trough completing a housing for the conductor.

5. In a bus structure, in combination, a bus conductor, a curved trough for the conductor, a supporting member having a curved bore for the trough with integrally formed diametrically opposed bosses projecting through openings in the trough, said trough being substantially spaced from the curved surface of the supporting member and secured to said member around said bosses, insulators attached to said bosses for supporting the conductor, and a cover for the trough completing a housing for the conductor, clamping means secured to the trough and the cover for attaching the cover to the trough, a retainer strip disposed inside the housing and spaced from said clamping means, and a gasket disposed between the edge of the trough and the edge of the cover and in the space between the clamping means and the retainer strip.

6. In a bus structure, in combination, a bus conductor, a curved trough for the conductor, a supporting member having a curved bore for the trough with integrally formed diametrically opposed bosses projecting through openings in the trough, said trough being spaced from most of the curved surface of the supporting member and secured to said member around said bosses, said trough also being secured to the curved surface of said member at predetermined points, insulators attached to said bosses for supporting the conductor, and a cover mounted on the trough to complete a housing for the conductor.

7. In a bus structure, in combination, a bus conductor, a curved trough for the conductor, a supporting member having a curved bore for the trough with integrally formed diametrically opposed bosses projecting through openings in the trough, said trough being spaced from a major part of the curved surface of the supporting member and secured to said member around said bosses, insulators attached to said bosses for supporting the conductor, and a cover for the trough completing a housing for the conductor, angle members secured to the trough and the cover for attaching the cover to the trough, a retainer strip disposed inside the housing and spaced from one of the angle members, and a gasket disposed between the edge of the trough and the edge of the cover and in the space between the angle member and the retainer strip.

8. In a bus structure, in combination, a bus conductor, a curved trough section for the conductor, a supporting member spaced from a major part of the outer surface of the trough, said trough being secured to the supporting member at substantially diametrically opposite points, diametrically opposed insulators mounted in the trough and secured to the supporting member inside the trough at said points for supporting the conductor, a cover for the trough completing a housing section for the conductor, fastening means disposed longitudinally of the housing section for attaching the cover to the trough, a straight gasket disposed between the edge of the trough and the edge of the cover, said gasket extending beyond the ends of said fastening means, a housing member overlapping a portion of said housing section which extends beyond the ends of said fastening means, and a circular gasket disposed between the housing member and the housing section, said circular gasket overlapping said straight gasket.

9. In a bus structure, in combination, a bus conductor, a curved trough section for the conductor, a supporting member having a curved bore for the trough, said trough being secured to the supporting member at substantially diametrically opposite points diametrically opposed insulators mounted in the trough for supporting the conductor, a cover for the trough completing a housing section for the conductor, a straight gasket disposed between the edge of the trough and the edge of the cover, an additional trough section disposed coaxially with the first-named trough section and having a removable cover section, an additional straight gasket disposed between the edge of the additional trough section and the edge of its cover section, a clamping member overlapping adjacent ends of said housing sections, and circular gaskets disposed between the clamping member and the housing sections and overlapping the straight gaskets.

10. In a bus structure, in combination, a bus conductor, a curved trough section for the conductor, a supporting member having a curved bore for the trough, said trough being secured to the supporting member at substantially diametrically opposite points, diametrically opposed insulators mounted in the trough for supporting the conductor, a cover for the trough completing a housing section for the conductor, a straight gasket disposed between the edge of the trough and the edge of the cover, an additional trough section disposed coaxially with the first-named trough section and having a removable cover section, an additional straight gasket disposed between the edge of the additional trough section and the edge of its cover section, a split clamping member overlapping adjacent ends of said housing sections, circular gaskets disposed between the clamping member and the housing sections and overlapping the straight gaskets, and an additional straight gasket disposed between the edges of the clamping member and overlapping said circular gaskets.

11. In a bus structure, in combination, a bus conductor, a curved trough section for the conductor, a supporting member having a curved bore for the trough, said trough being secured to the supporting member at substantially diametrically opposite points, diametrically opposed insulators mounted in the trough for supporting the conductor, a cover for the trough completing a housing section for the conductor, a straight gasket disposed between the edge of the trough and the edge of the cover, an additional trough section disposed coaxially with the first-named trough section and having a removable cover section, an additional straight gasket disposed between the edge of the additional trough section and the edge of its cover section, a clamping member overlapping adjacent ends of said housing section, circular gaskets disposed between the clamping member and the housing sections and overlapping the straight gaskets, and a grounding bolt connecting said additional trough section and said clamping member to said supporting member.

12. In a bus structure, in combination, a bus conductor, a housing for enclosing the conductor, openings extending through opposite sides of the housing, a supporting member having spaced legs disposed outside the housing with oppositely disposed bosses projecting through the openings in the housing, and insulating means within the housing attached to said oppositely disposed bosses for supporting the conductor.

13. In a bus structure, in combination, a bus conductor, a housing for enclosing the conductor, said housing having oppositely disposed openings therein, a supporting member having spaced legs disposed outside the housing with oppositely disposed bosses projecting through the openings in the housing, said supporting member being spaced from a major part of the outer surface of the housing, and insulating means disposed inside the housing and attached to said bosses for supporting the conductor.

14. In a bus structure, in combination, a bus conductor, a curved trough for the conductor, a supporting member disposed outside the trough, said curved trough being attached to the supporting member only at predetermined spaced points, substantially diametrically opposed flat mounting surfaces on the supporting member inside the curved trough, insulators disposed inside the curved trough and attached to the flat mounting surfaces on the supporting member to support the conductor, and a cover removably attached to the trough.

15. In a bus structure, in combination, a bus conductor, a housing for enclosing the conductor, openings extending through opposite sides of the housing, a supporting member having a base portion and upstanding spaced legs disposed outside the housing with oppositely disposed bosses projecting inwardly through the openings in the housing, sealing means around the openings in the housing through which the bosses extend, and insulating means within the housing attached to said oppositely disposed bosses for supporting the conductor.

References Cited in the file of this patent

UNITED STATES PATENTS

| | | |
|---|---|---|
| 2,197,737 | Appleton | Apr. 16, 1940 |
| 2,313,972 | Rugg | Mar. 16, 1943 |
| 2,469,445 | Scott | May 10, 1949 |
| 2,531,017 | West | Nov. 21, 1950 |
| 2,591,386 | Swerdlow | Apr. 1, 1952 |
| 2,706,744 | Rudd | Apr. 19, 1955 |